Patented Sept. 25, 1928.

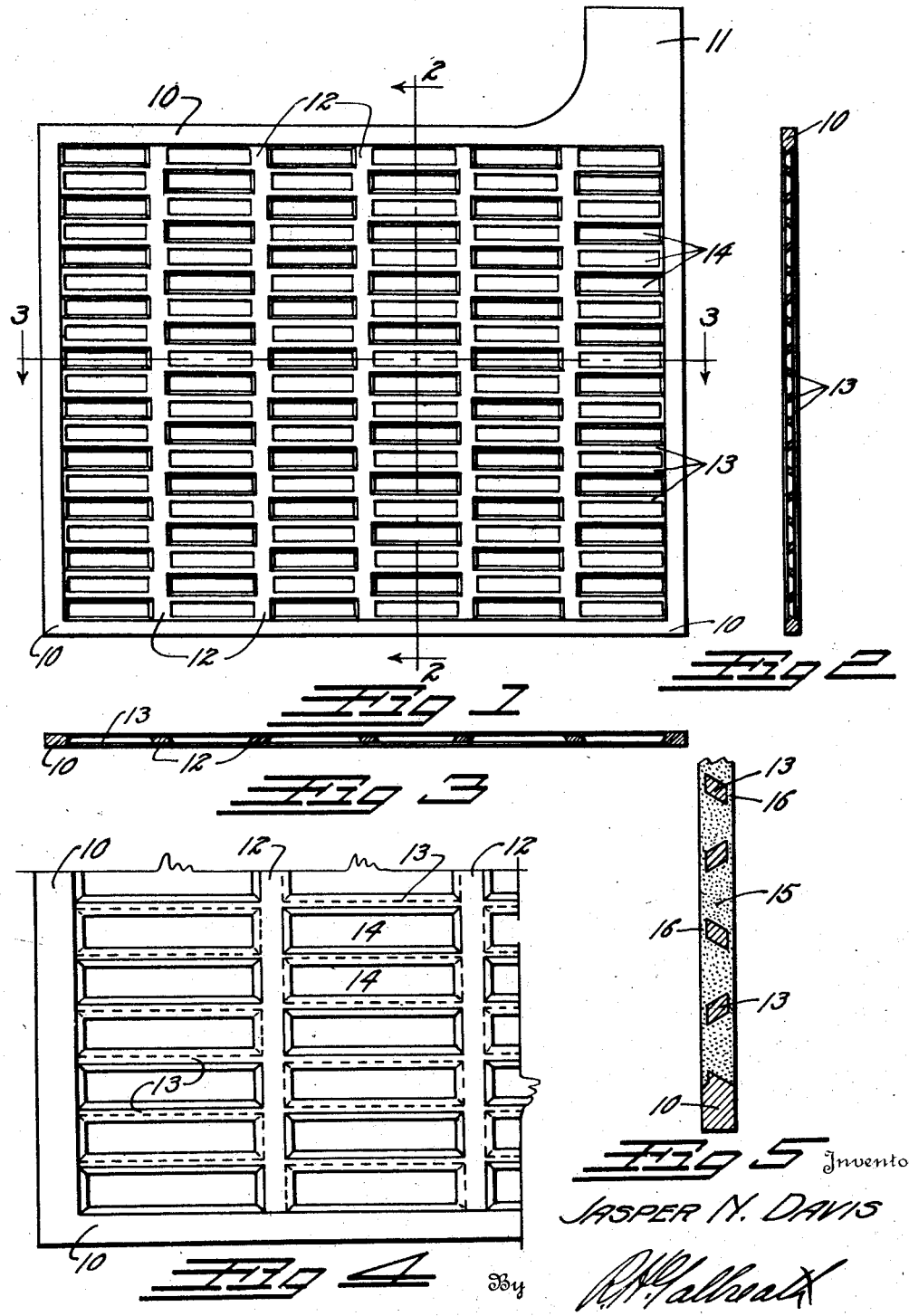

1,685,215

UNITED STATES PATENT OFFICE.

JASPER N. DAVIS, OF DENVER, COLORADO.

STORAGE-BATTERY PLATE.

Application filed June 1, 1926. Serial No. 112,841.

This invention relates to a plate for a storage battery and has for its principal object the provision of a storage battery plate grid which can be easily cast from two co-acting molds which will not become frozen to the casting so as to injure its skeleton structure.

Another object of the invention is to provide a grid which will efficiently lock the active material in place.

A further object of the invention is to provide a storage battery plate in which the entire skeleton of the grid structure will be covered by the active material.

Other objects and advantages reside in the detail construction of the invention, which is designed for simplicity, efficiency and economy. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a face view of the grid employed in my invention.

Fig. 2 is a vertical section through the grid taken on the line 2—2, Fig. 1.

Fig. 3 is a horizontal section through the grid, taken on the line 3—3, Fig. 1.

Fig. 4 is a magnified view of a portion of the grid.

Fig. 5 is a magnified cross section through the grid with the active material in place.

The complete grid of my improved storage battery plate si illustrated in Fig. 1 and is arranged to be cast from lead. The casting is formed with a raised border or frame 10, from which projects the usual terminal lug 11. The skeleton structure of the grid is of less thickness than the frame 10 and comprises a series of vertical bars 12, inter-connected at uniform distances by a series of relatively narrower horizontal bars 13. The spacing of the bars 12 and 13 is such as to form a series of uniform, elongated, rectangular cells 14.

The casting is formed from two co-acting molds (not shown) which are illustrated, described, and claimed in applicant's co-pending application. The molds contact with opposite sides of the casting and each mold has lugs in the form of truncated pyramids which form alternate cells in the completed grid so that each cell will be of greater area at one side of the grid than at the other side thereof, and in each face of the grids, the smaller faces of the cells will alternate with the larger faces, as illustrated in Figs. 1 and 4. This construction necessitates the bars 13 being rhomboidal in cross section and alternately parallel, as shown in Fig. 2.

The vertical bars 12 are similarly rhomboidal in cross section and are alternately parallel throughout the same horizontal plane. They alternate, however, throughout their vertical lengths as to their cross sectional angles at each horizontal series of cells, owing to the alternate placing of the pyramidal cells, as clearly illustrated in Figs. 1 and 4.

Since the skeleton is of less thickness than the frame of the grid, the active material, shown in place at 15, Fig. 5, will be flush with the frame and will completely cover and conceal the skeleton. The active material 15 is prevented from falling through a cell in one direction by the decreasing angle of the cell sides and from falling through in the other direction by the overlapping flange of active material 16 which is formed over each of the bars 12 and 13 in the skeleton.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. In a storage battery plate a grid having a series of parallel, intersecting bars, said bars being rhomboidal in cross section, the cross sections of adjacent bars being at an angle to each other and the cross sections of alternate bars being parallel to each other.

2. A grid for storage battery plates comprising a frame; a series of parallel horizontal bars in said frame, said bars being arranged so that in vertical section the faces of adjacent bars incline toward each other as one face of the grid is approached and the faces of alternate bars lie parallel.

3. A grid for storage battery plates comprising a frame; a series of parallel horizontal bars in said frame, said bars being arranged so that in vertical section the opposed faces of adjacent bars incline toward each other as one face of the grid is approached and the faces of alternate bars lie parallel; and a series of vertical bars interconnecting said horizontal bars; two faces of each of said vertical bars being in a plane parallel to the plane of said frame, the remaining two faces of each alternate horizontal bar being parallel with each other and at an angle to the two faces of the bar therebetween.

In testimony whereof, I affix my signature.

JASPER N. DAVIS.